US010737888B1

(12) United States Patent
MacArthur et al.

(10) Patent No.: US 10,737,888 B1
(45) Date of Patent: Aug. 11, 2020

(54) SAFETY SWITCH MECHANISM FOR A CONVEYOR SYSTEM

(71) Applicant: Honda Motor Co., Ltd., Tokyo (JP)

(72) Inventors: Benjamin B. MacArthur, Barrie (CA); Dwayne Switzer, Angus (CA); David Robert Winning, Barrie (CA); Cameron Forward, Whitney (CA)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/516,929

(22) Filed: Jul. 19, 2019

(51) Int. Cl.
*B65G 47/32* (2006.01)
*B65G 43/00* (2006.01)

(52) U.S. Cl.
CPC ............. *B65G 47/32* (2013.01); *B65G 43/00* (2013.01); *B65G 2207/36* (2013.01); *B65G 2207/40* (2013.01)

(58) Field of Classification Search
CPC ............... B65G 47/32; B65G 2207/40; B65G 2207/36; H01H 35/027
USPC ....... 198/502.1, 502.2, 502.3, 502.4, 810.01, 198/810.02, 810.03, 810.4
See application file for complete search history.

(56) References Cited

U.S. PATENT DOCUMENTS

| | | | | |
|---|---|---|---|---|
| 2,345,415 A * | 3/1944 | Nagy, Jr. | ................ | B65G 23/00 198/502.1 |
| 2,589,220 A * | 3/1952 | Buckeridge | ............ | B65G 23/00 198/502.1 |
| 2,614,684 A * | 10/1952 | Daniels | .................. | B65G 23/00 198/572 |
| 3,291,953 A * | 12/1966 | Luik | ...................... | H01H 13/18 200/330 |
| 3,789,177 A * | 1/1974 | Carpenter | ................ | H01H 3/16 200/332 |
| 4,154,995 A * | 5/1979 | Kantarian | ................ | H01H 3/16 198/502.1 |
| 9,610,992 B2 | 4/2017 | Hosker | | |

FOREIGN PATENT DOCUMENTS

| | | |
|---|---|---|
| CN | 105712204 | 6/2016 |
| CN | 205294699 | 6/2016 |
| CN | 207844928 | 9/2018 |
| DE | 2740301 | 3/1979 |
| DE | 202005016832 | 1/2006 |
| GB | 2504817 | 2/2014 |
| JP | 2015518804 | 7/2017 |

\* cited by examiner

*Primary Examiner* — William R Harp
(74) *Attorney, Agent, or Firm* — Rankin, Hill & Clark LLP

(57) ABSTRACT

A safety switch mechanism for use on a conveyor system includes a lever adapted for pivotal attachment to a non-moving part of the conveyor system. A non-contact safety switch has a first switch part attached the lever and a second switch part fixed relative to the lever. The safety switch has an open position where the first switch part is angularly offset from the second switch part relative to a lever pivot axis and a closed position where the first switch part is aligned with the second switch part. A trigger block is adapted for attachment to a moving part of the conveyor system. The lever is configured as a pendulum and in an equilibrium position of the lever the safety switch is in the open position. The trigger block is configured to contact and pivot the lever moving the safety switch from the open position to the closed position.

20 Claims, 4 Drawing Sheets

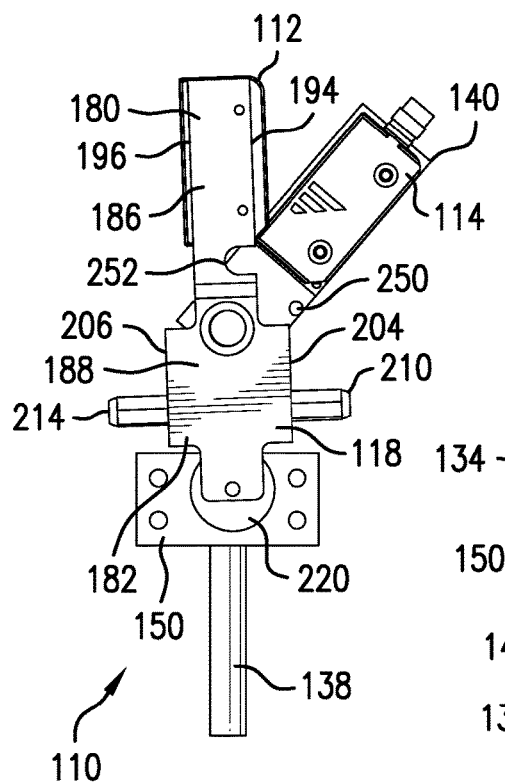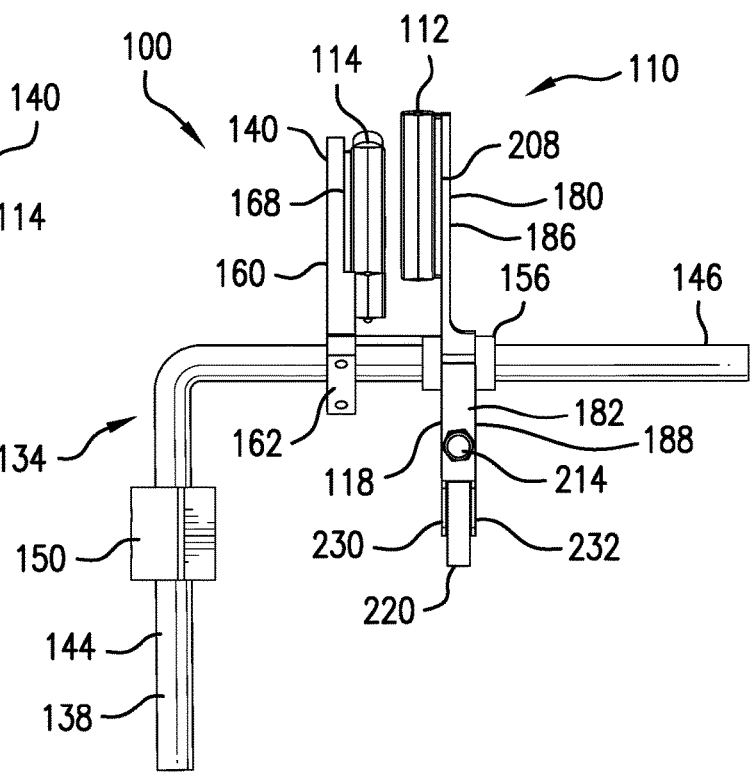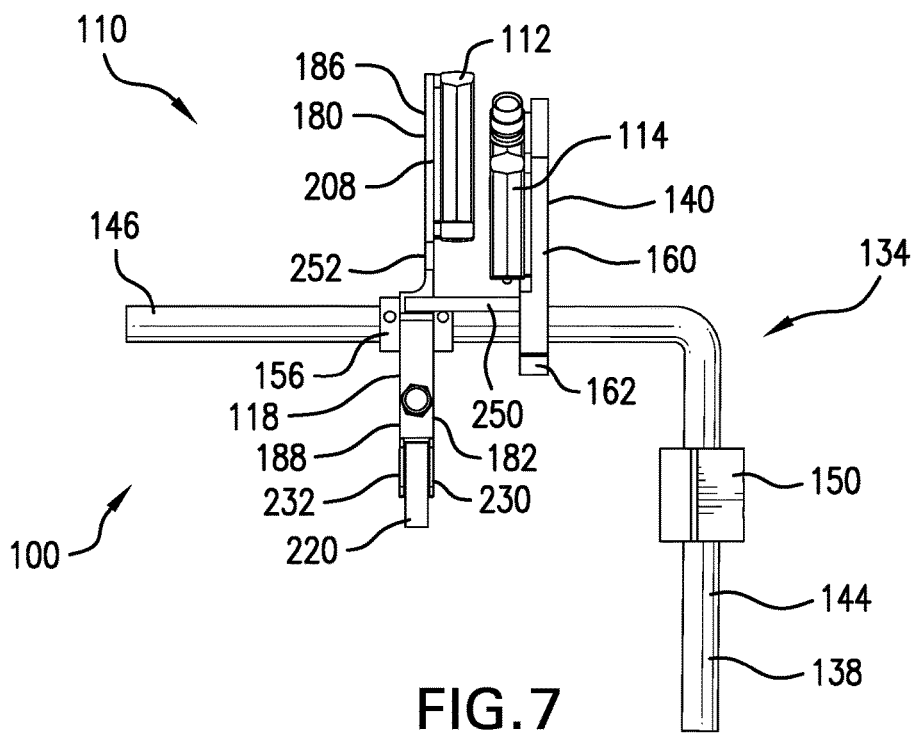

SAFETY SWITCH MECHANISM FOR A CONVEYOR SYSTEM

BACKGROUND

Conveyor systems are commonly used in vehicle assembly lines to transport workpieces (e.g., an engine). In many of these conveyors, the workpiece is mounted to a part carrier that is then drivably engaged by a pusher to one of the assembly stations in the assembly line. Typically, a safety switch is associated with the conveyor which when activated identifies a position of the part carrier being moved along by the pusher. The safety switch generally includes a first switch part mounted to, for example, a frame of the conveyor and a second switch mounted to the part carrier or pusher. However, if the pusher is moving too fast contact time between the first and second switch parts is reduced limiting the time that the safety switch is activated. And due to an increased speed of the pusher, the safety switch may not reset, which can result in downtime for the conveyor.

BRIEF DESCRIPTION

According to one aspect, a safety switch mechanism for use on a conveyor system comprises a lever adapted for pivotal attachment to an associated non-moving part of the conveyor system. A non-contact safety switch has a first switch part attached the lever and a second switch part fixed relative to the lever. The safety switch has an open position where the first switch part is angularly offset from the second switch part relative to a pivot axis of the lever and a closed position where the first switch part is aligned with the second switch part. A trigger block is adapted for attachment to an associated moving part of the conveyor system. The lever is configured as a pendulum and in an equilibrium position of the lever the safety switch is in the open position. The trigger block is configured to contact and pivot the lever moving the safety switch from the open position to the closed position.

According to another aspect, a safety switch mechanism for use on a conveyor system comprises a mounting member adapted for attachment to an associated non-moving part of the conveyor system. A lever is pivotally secured to the mounting member. A non-contact safety switch has a first switch part attached the lever and a second switch part attached to the mounting member. The safety switch has an open position where the first switch part is angularly offset from the second switch part relative to a pivot axis of the lever and a closed position where the first switch part is aligned with the second switch part. A trigger block is adapted for attachment to an associated moving part of the conveyor system. The lever is configured as a pendulum, and includes a first end portion having the first switch part attached thereto and a second end portion having a balancing weight attached thereto. In an equilibrium position of the lever the safety switch is in the open position. The trigger block is configured to contact and pivot the lever moving the safety switch from the open position to the closed position.

According to another aspect, a conveyor system comprises a conveyor including a frame defining a guide path for a movable pusher, and a safety switch mechanism mounted to the conveyor. The safety switch mechanism includes a mounting member attached to the frame, a lever pivotally secured to the mounting member and suspended over the guide path, and a non-contact safety switch having a first switch part attached the lever and a second switch part attached to the mounting member. The safety switch has an open position where the first switch part is angularly offset from the second switch part relative to a pivot axis of the lever and a closed position where the first switch part is aligned with the second switch part. A trigger block is attached to the pusher. The trigger block is configured to contact and pivot the lever as the pusher moves past the lever, and pivoting of the lever moves the safety switch from the open position to the closed position. The trigger block includes an elongated contact surface for an extended contact with the lever to maintain the safety switch in the closed position for a predetermined period of time.

BRIEF DESCRIPTION OF THE DRAWINGS

FIGS. 5, 6 and 7 are elevational views of the safety switch of FIG. 3.

DETAILED DESCRIPTION

Figure 1:
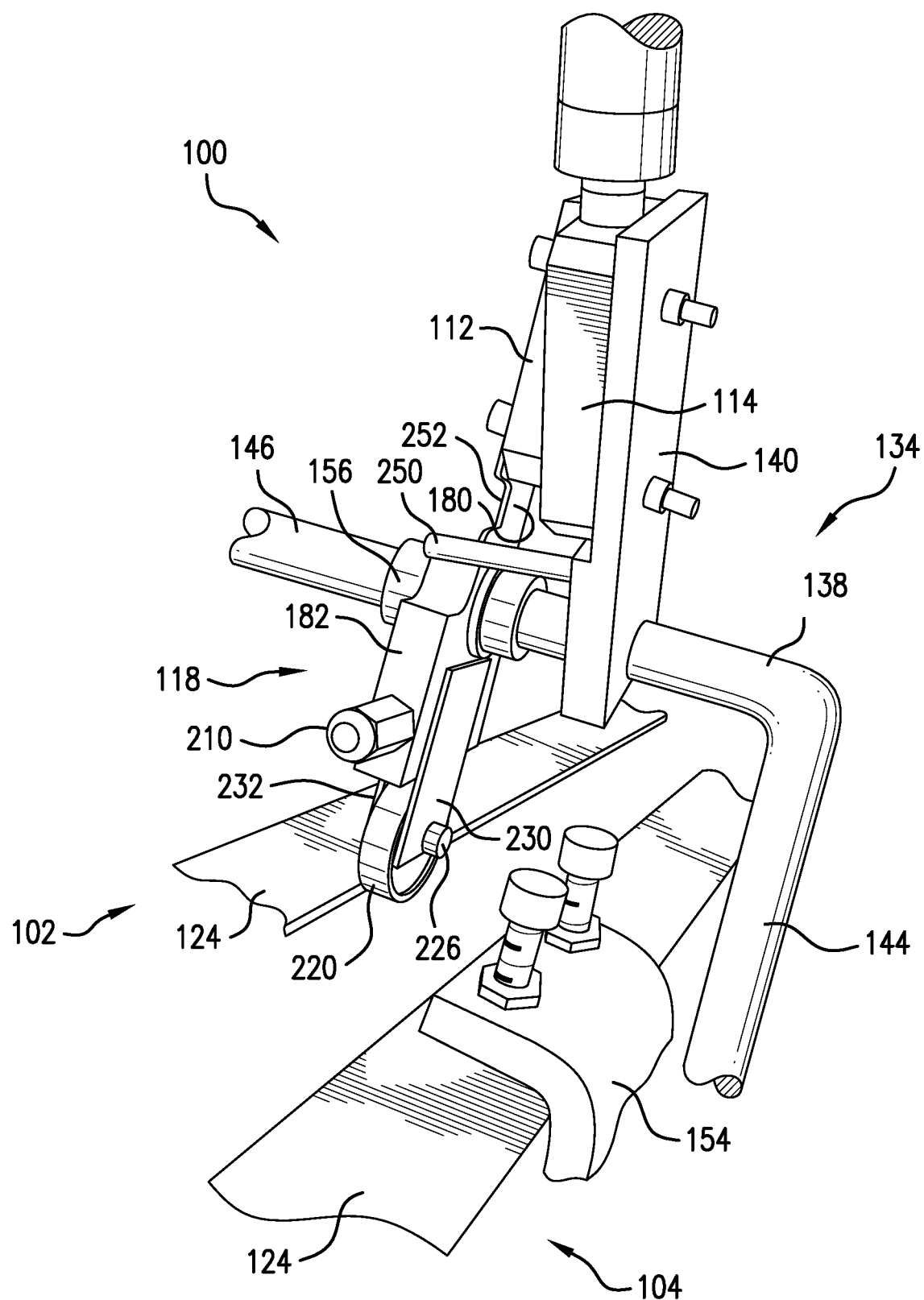
FIG. 1 is a perspective view of a safety switch of a safety switch mechanism according to the present disclosure, the safety switch is secured to a non-moving part of a conveyor of a conveyor system.

It should, of course, be understood that the description and drawings herein are merely illustrative and that various modifications and changes can be made in the structures disclosed without departing from the present disclosure. Referring now to the drawings, wherein like numerals refer to like parts throughout the several views, FIGS. 1-7 depict an exemplary safety switch mechanism 100 according to the present disclosure secured to a conveyor 102 of a conveyor system 104 that can be used, for example, in a vehicle assembly line to transport a workpiece, such as an engine. The safety switch mechanism 100 generally comprises a non-contact safety switch 110 having a movable first switch part 112 and a second switch part 114 fixed relative to the first switch part for sensing the presence of the first switch part 112 without mechanical contact between the first and second switch parts. According to the depicted aspect, the safety switch mechanism 100 comprises a lever 118 and a trigger block 120 for pivotally moving the lever 118. The lever 118 is adapted for pivotal attachment to a non-moving part (e.g., a frame 124) of the conveyor 102. The trigger block 120 is adapted for attachment to a moving part (e.g., a part carrier or pusher 126) of the conveyor 102, which moves along a guide path defined by the frame 124. The first switch part 112 is attached to the lever 118 and the second switch part 114 is fixed relative to the lever 118. In use, the trigger block 120 is configured to contact and pivot the lever 118 as the part carrier or pusher 126 moves past the lever 118, and pivoting of the lever 118 moves the safety switch 110 from an open, non-activated position—where the first switch part 112 is angularly offset from the second switch part 114 relative to a pivot axis of the lever 118—to a closed, activated position—where the first switch part 112 is angularly aligned with the second switch part 114. In the closed position, the safety switch 110 is activated to identify a position of the workpiece being moved along by the conveyor 102.

Figure 3:
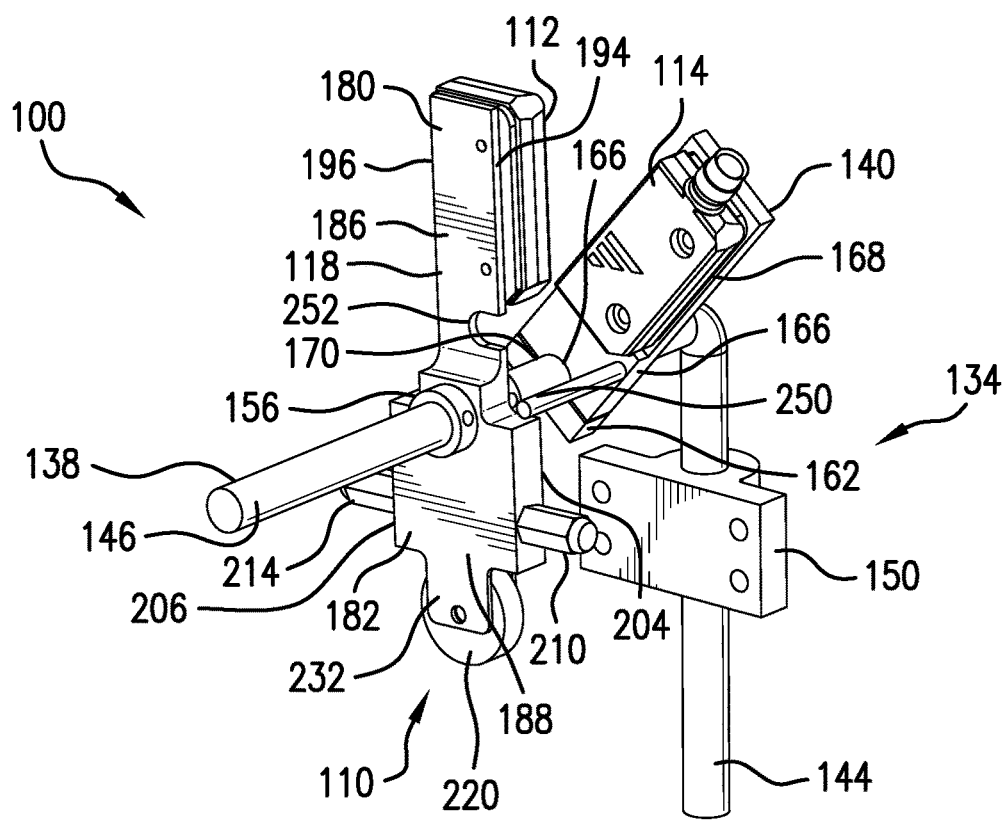
FIG. 3 is a perspective view of the safety switch in an open, non-activated position.
Figure 4:
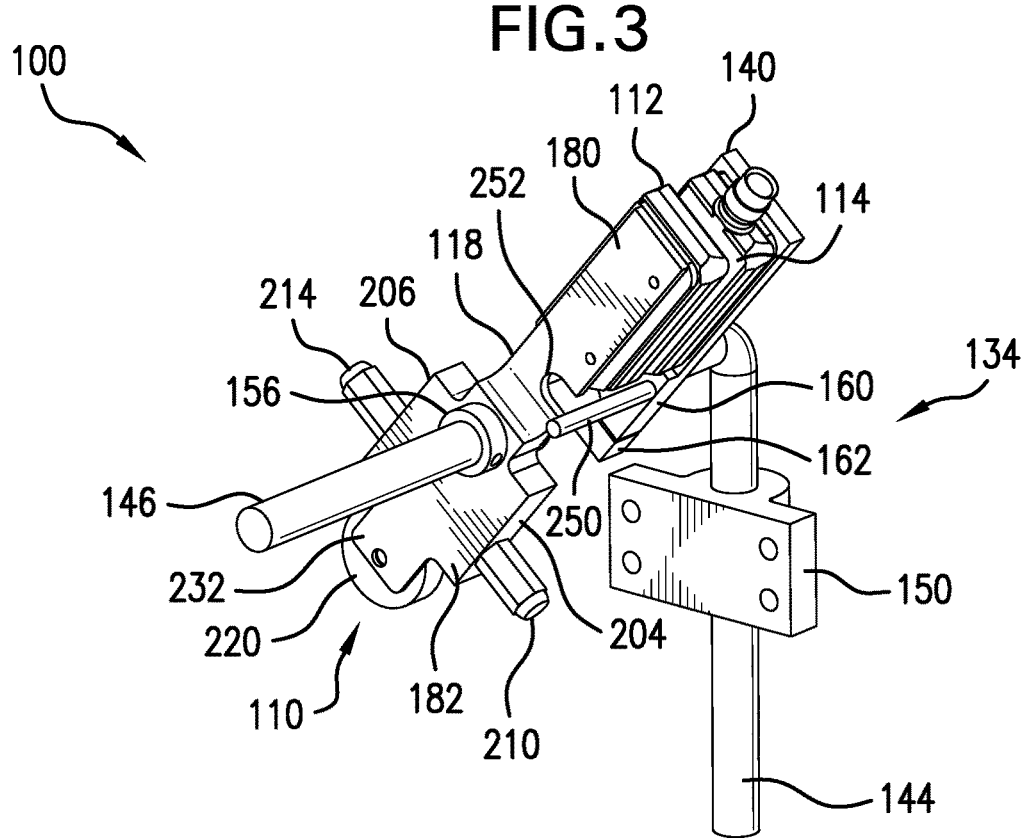
FIG. 4 is a perspective view of the safety switch in a closed, activated position.

A mounting member 134 provided as part of the exemplary safety switch mechanism 100 is adapted for attachment to the frame 124 of the conveyor 102 (see FIG. 1). The lever 118 is pivotally secured to the mounting member 134 so as to be suspended over the moving pusher 126, which allows for contact of the trigger block 120 mounted to the pusher. As shown, the mounting member 134 includes a support or rod 138 and a bracket 140 secured to the rod. The rod is shaped to properly position the lever 118 over the guide path for the moving pusher 126. According to one aspect, the rod 138 has a first section 144 and a second section 146 extending substantially perpendicular to the first section 144. The first section 144 of the rod is connected to a mount 150 which can be fastened to a clamp 154 attached to the frame 124 of the conveyor 102 (see FIG. 1). The lever 118 is pivotally secured to the second section 146 of the rod 138, for example, via a bearing 156 fitted between the rod and the lever. The bracket 140 is fixedly secured to the second section 146 of the rod 138 inward of the lever 118. With reference to FIGS. 3 and 4, the bracket 140 can include a first bracket part 160 and a second bracket part 162 that when fastened to the first bracket part fixedly secures the bracket 140 to second section 146. The first bracket part 160 has first cutout 166 and a recessed portion 168 for attachment of the second switch part 114. The second bracket part 162 has a second cutout 170 that corresponds in shape to the first cutout 166. The first and second cutouts 166, 170 together define a through hole for the second section 146 of the rod 138.

As shown in FIGS. 3-7, the lever 118 is configured as a pendulum and in an equilibrium position of the lever the safety switch 110 is in the open position. More particularly, the lever 118 includes a first end portion 180 and a second end portion 182 with the pivot axis of the lever located between the first and second end portions. According to one aspect, the first end portion 180 is sized smaller than the second end portion 182 with an outer surface 186 of the first end portion 180 offset inwardly (toward the bracket 140) from an outer surface 188 of the second end portion 182 and with opposite sides 194, 196 of the first end portion 180 offset inwardly (toward the rod 138) from respective opposite sides 204, 206 of the second end portion 182. An inner surface 208 of the first end portion 180 of the lever 118 has the first switch part 112 attached thereto, with the first switch part 112 facing the second switch part 114. The second end portion 182 of the lever 118 has a first balancing weight 210 attached thereto. In the depicted aspect, the second end portion 182 of the lever 118 can also have a second balancing weight 214 attached thereto. The first and second balancing weights 210, 214 are provided on the respective opposite sides 204, 206 of the second end portion 182; although, alternative locations on the second end portion 182 for the balancing weights are contemplated. It should be appreciated that the first and second balancing weights 210, 214 can be selected to balance the swing of the lever 118 after contact with the trigger block 120 (i.e., when the trigger block 120 is not below the lever 118). However, it should also be appreciated that instead of the balancing weights the second end portion 182 of the lever can be sized to properly balance the swing of the lever. Further, the second end portion 182 of the lever 118 includes a roller 220 for engaging an elongated contact surface 222 of the trigger block 120. The roller 220 can be attached via an axle 226 to mounting tabs 230, 230 depending from the lever.

Figure 2:
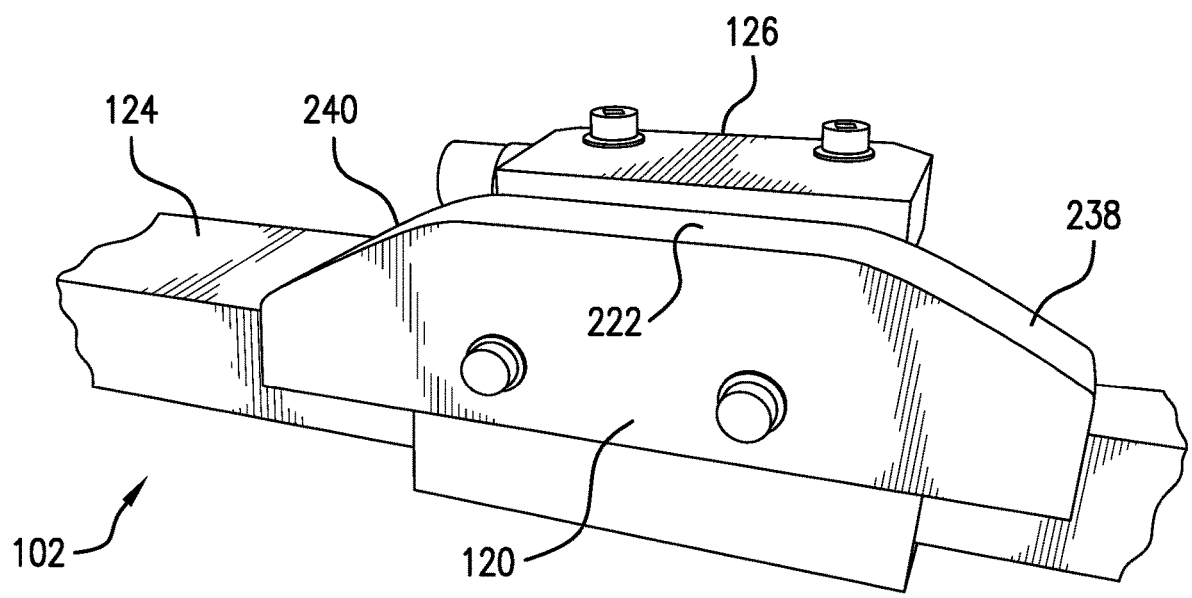
FIG. 2 is a perspective view a trigger block of the safety switch mechanism attached to a moving part of the conveyor.

With reference to FIG. 2, the trigger block 120 includes the elongated contact surface 222 for an extended contact with roller 220 of the lever 118 to maintain the safety switch 110 in the closed position for a predetermined period of time. By holding the safety switch in the closed position, the location of the part carrier or pusher 126 along the conveyor is properly identified allowing a worker to safely remove the workpiece from the conveyor 102. The trigger block 120 can include a ramp section 238 that transitions into the contact surface 222, and the ramp section 238 can be sized to further control to movement of the lever 118. In the depicted aspect, the contact surface 222 of trigger block 120 is flanked by ramp sections 238, 240 and the trigger block can be substantially trapezoidal shaped in side view; although; alternative shapes for the trigger block are contemplated. Further, as depicted in FIGS. 3 and 4, a stop member 250 extends from the bracket 140 to limit pivoting movement of the lever 118, and the lever 118 can be provided with a cutout or recessed portion 252 on its side 194 for selectively receiving the stop member. With the use of the stop member 250, the angular alignment of the first and second sensor parts 112, 114 in the closed position of the safety switch 110 is confirmed.

Accordingly, the present disclosure provides a safety switch mechanism 100 having a safety switch 110. The safety switch 110 includes an actuator (i.e., the first switch part 112) attached to a lever 118 in the form of a weighted pendulum, which returns the safety switch 110 to an open position when the trigger block 120 is not below the lever 118. The trigger block 120 is attached to a part carrier or pusher and varying the length of the contact surface 222 of the trigger block 120 varies the length of time the safety switch 110 is in the closed position as the part carrier is passing. Therefore, the length of the contact surface 222 is determined based on the desired length of time the safety switch 110 is in the closed position as the part carrier is passing is passing the lever 118.

It will be appreciated that the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A safety switch mechanism for use on a conveyor system, comprising:
 a lever adapted for pivotal attachment to an associated non-moving part of the conveyor system;
 a non-contact safety switch having a first switch part attached to the lever and a second switch part fixed relative to the lever, the safety switch having an open position where the first switch part is angularly offset from the second switch part relative to a pivot axis of the lever and a closed position where the first switch part is aligned with the second switch part; and
 a trigger block adapted for attachment to an associated moving part of the conveyor system, wherein the lever is configured as a pendulum and in an equilibrium position of the lever the safety switch is in the open position, and the trigger block is configured to contact and pivot the lever moving the safety switch from the open position to the closed position.

2. The safety switch mechanism of claim 1, wherein the lever includes a first end portion having the first switch part attached thereto and a second end portion having a balancing weight attached thereto.

3. The safety switch mechanism of claim 2, wherein the second end portion of the lever includes a roller for engaging a contact surface of the trigger block.

4. The safety switch mechanism of claim 2, wherein the second end portion of the lever has a second balancing weight attached thereto, the balancing weight and the second balancing weight provided on opposite sides of the second end portion of the lever.

5. The safety switch mechanism of claim 2, wherein the pivot axis of the lever is located between the first and second end portions.

6. The safety switch mechanism of claim 1, wherein the trigger block includes an elongated contact surface for an extended contact with the lever to maintain the safety switch in the closed position for a predetermined period of time.

7. The safety switch mechanism of claim 6, wherein the trigger block includes a ramp section that transitions into the contact surface.

8. The safety switch mechanism of claim 7, wherein the contact surface of the trigger block is flanked by ramp sections.

9. The safety switch mechanism of claim 1, further including a mounting member adapted for attachment to the non-moving part of the conveyor system, the lever pivotally secured to the mounting member to be suspended over the moving part of the conveyor system.

10. The safety switch mechanism of claim 9, wherein the mounting member includes a rod and a bracket secured to the rod, the lever is pivotally secured to the rod and the second switch part is attached to the bracket.

11. The safety switch mechanism of claim 10, wherein a stop member extends from the bracket to limit pivoting movement of the lever.

12. The safety switch mechanism of claim 11, wherein the lever is provided with a recessed portion for selectively receiving the stop member.

13. A safety switch mechanism for use on a conveyor system, comprising:
a mounting member adapted for attachment to an associated non-moving part of the conveyor system;
a lever pivotally secured to the mounting member;
a non-contact safety switch having a first switch part attached the lever and a second switch part attached to the mounting member, the safety switch having an open position where the first switch part is angularly offset from the second switch part relative to a pivot axis of the lever and a closed position where the first switch part is aligned with the second switch part; and
a trigger block adapted for attachment to an associated moving part of the conveyor system,
wherein the lever is configured as a pendulum, the lever includes a first end portion having the first switch part attached thereto and a second end portion having a balancing weight attached thereto, and in an equilibrium position of the lever the safety switch is in the open position,
wherein the trigger block is configured to contact and pivot the lever moving the safety switch from the open position to the closed position.

14. The safety switch mechanism of claim 13, wherein the second end portion of the lever includes a roller for engaging the trigger block.

15. The safety switch mechanism of claim 14, wherein the trigger block includes an elongated contact surface for an extended contact with the roller to maintain the safety switch in the closed position for a predetermined period of time.

16. The safety switch mechanism of claim 13, wherein the mounting member includes a rod and a bracket secured to the rod, the lever is pivotally secured to the rod and the second switch part is attached to the bracket, wherein a stop member extends from the bracket to limit pivoting movement of the lever.

17. A conveyor system, comprising:
conveyor including a frame defining a guide path for a movable pusher; and
a safety switch mechanism mounted to the conveyor, the safety switch mechanism including:
a mounting member attached to the frame;
a lever pivotally secured to the mounting member and suspended over the guide path; and
a non-contact safety switch having a first switch part attached the lever and a second switch part attached to the mounting member, the safety switch having an open position where the first switch part is angularly offset from the second switch part relative to a pivot axis of the lever and a closed position where the first switch part is aligned with the second switch part; and
a trigger block attached to the pusher, the trigger block configured to contact and pivot the lever as the pusher moves past the lever, and pivoting of the lever moves the safety switch from the open position to the closed position, wherein the trigger block includes an elongated contact surface for an extended contact with the lever to maintain the safety switch in the closed position for a predetermined period of time.

18. The conveyor system of claim 17, wherein the lever is configured as a pendulum, the lever includes a first end portion having the first switch part attached thereto and a second end portion having a balancing weight attached thereto, and in an equilibrium position of the lever the safety switch is in the open position.

19. The conveyor system of claim 18, wherein the second end portion of the lever includes a roller for engaging the contact surface of the trigger block.

20. The conveyor system of claim 17, wherein the mounting member includes a stop member adapted to limit pivoting movement of the lever.

* * * * *